(12) United States Patent
Funakoshi et al.

(10) Patent No.: US 6,682,322 B2
(45) Date of Patent: Jan. 27, 2004

(54) AIR-CONDITIONER FOR USE IN AN AUTOMOBILE

(75) Inventors: Sunao Funakoshi, Chiyoda (JP); Hidenori Yokoyama, Oohira (JP); Masao Imanari, Chiyoda (JP); Masatsugu Chikano, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/098,057

(22) Filed: Mar. 15, 2002

(65) Prior Publication Data

US 2003/0082061 A1 May 1, 2003

(30) Foreign Application Priority Data

Oct. 31, 2001 (JP) ........................................ 2001-333668

(51) Int. Cl.[7] .............................. F04B 17/00; F01C 1/02
(52) U.S. Cl. .................... 417/410.5; 417/902; 417/281; 418/55.1; 418/55.6
(58) Field of Search .............................. 417/410.5, 902, 417/281; 418/55.1, 55.6

(56) References Cited

U.S. PATENT DOCUMENTS 5,358,392 A * 10/1994 Ukai .................. 418/55.6
5,931,650 A * 8/1999 Yasu et al. .................. 418/55.3
6,276,901 B1 * 8/2001 Farr et al. ...................... 417/13
6,299,424 B1 * 10/2001 Futagami et al. .......... 418/55.2
6,478,557 B2 * 11/2002 Shiibayashi et al. ....... 418/55.2

FOREIGN PATENT DOCUMENTS

JP            11-044296        2/1999

* cited by examiner

*Primary Examiner*—Justine R. Yu
*Assistant Examiner*—Michael K. Gray
(74) *Attorney, Agent, or Firm*—Antonelli, Terry, Stout & Kraus, LLP

(57) ABSTRACT

In an electromotive compressor of an air-conditioner for use in an automobile, an interior space of a container of a compressor is divided into a space including a compression mechanism portion and an electric motor portion, and an oil storage space, wherein an oil passage is provided in a lower portion while a partition having a gas passage in an upper portion thereof, and a gas emission pipe is provided in one of the two (2) spaces at the oil storage portion side, being divided by the partition plate, while an oil supply pipe in the other, thereby making an opening of the oil supply pipe dipped within the lubricating oil even when a car declines.

18 Claims, 5 Drawing Sheets

AIR-CONDITIONER FOR USE IN AN AUTOMOBILE

BACKGROUND OF THE INVENTION

1. Field of the Invention

The present invention relates to an air-conditioner for use in an automobile, and in particular, relates to an electromotive compressor of the air-conditioner for use in an automobile.

2. Description of Prior Art

In recent years, demands or requirements are strongly made or called for upon a regulation on an amount of discharge of carbon dioxide and/or on reduction of harmful materials. For achieving such the requirement, in particular in an automobile, development is actively made on an electric car, applying a fuel cell or battery of low pollution as an electric power source therein, and it is practiced in actual. On the other hand, an "idle-stop" (or "idling-stop") car is put onto markets as a one, which can be practiced immediately by the technology of the present time.

By the way, in an automobile is used an air-conditioner for excusive use for cooling, however in a gasoline engine car or a diesel engine car, in general, an open-type compressor is used as such the compressor to be applied in the refrigeration cycle for use in the air-conditioner. Since this kind of compressor is driven by a driving source, such as, an engine for driving the vehicle, the compressor can be driven for conducting air-conditioning within an interior of a car, without any trouble, even when the vehicle stops, as far as the engine operates in the idling condition.

However, since the engine is stopped when the car stops in such the idle-stop car, therefore there is a drawback that the air-conditioning cannot be continued or conducted during this time period. In particular, the temperature within the car can be easily come up, for example on traffic jam in the middle of summer, therefore it brings about a problem. Also, in the electric car, since no engine is installed but a motor as the driving source of the vehicle, even assuming that the compressor is connected to the motor to be driven, the driving source of the compressor go away or does not operate when the car stops, in the same manner as was mentioned above, therefore also occurs a problem that the air-conditioning is unavailable.

For dissolving such the problem, a so-called an electromotive compressor is now taken into the consideration, wherein an electric motor is installed within an enclosed or hermetic chamber, so as to operate the compression mechanism by using it as the driving source thereof.

For example, in Japanese Patent Laying -Open No. Hei 11-44296 (1999) is described a scroll compressor or a rotary compressor, having the compression mechanism of high efficiency, wherein a horizontal-type electromotive compressor is applied as the compressor for use in an automobile.

Also, in this publication is listed up as problems, that the car receives inertia due to sudden stop or start and when accelerating or decelerating suddenly, as well as, inertia when ruing on a curve or doing a U-turn traveling, and that the car runs uphill or downhill and is stopped or parked on a slope. The enclosed or hermetic-type of the electromotive compressor uses lubricating oil, being lower in viscosity than that used in the open-type, and it causes no trouble since being installed horizontally in the case of the electromotive compressor for use in home use. However, in the case when applying such the enclosed or hermetic-type electromotive compressor into the car, the lubricating oil moves depending upon the traveling condition and/or the parking condition of the car, and some times occur cases where a lubricating environment is deteriorated, such as on bearings, etc.

For dissolving such the problem, in this publication is described that, main and auxiliary bearings are made up with ball and roller bearings in the enclosed or hermetic-type electromotive compressor, and oil supply to those bearings is carried out, compulsively, by the means of an oil supply pump.

However, in the horizontal-type compressor of the conventional art mentioned above, since a tip portion of the oil supply pipe is provided or located in a lower portion on the opposite side of a motor portion in the compressor mechanism, the lubricating oil is only distributed on the side of the compressor mechanism portion in a vessel or container when the compressor is inclined in such the direction that the compression mechanism portion comes to be low, therefore the tip portion of the oil supply pipe comes out above the oil surface, thereby stopping the supply of oil, and this brings about a possibility that the shaft and the bearings causes wear-out and/or seizure. Also, in the conventional art mentioned above, since a ball bearing is used as the shaft bearing, then it brings about a problem that the manufacturing of it comes to be high in the cost, comparing to a plain bearing.

In the case where there is a possibility that such the wear-out and/or seizure occurs, it is a necessity to detect this with provision of any detection means, thereby for stopping the compressor, however, also the air-conditioning cannot be performed if such the stop occurs very often, therefore an interior air within the car comes to be an uncomfortable one for a driver and/or user.

SUMMARY OF THE INVENTION

Therefore, an object according to the present invention, is to provide an air-conditioner for use in an automobile, in which a horizontal and enclosed or hermetic-type electromotive compressor is installed as a compressor in the refrigeration cycle for use in conditioning of an interior air of a car, and each of sliding portions hardly runs out of oil, therefore being able to reduce such the uncomfortable feeling given to the user.

For accomplishing such the object as was mentioned above, according to the present invention, there is provided an air-conditioner for use in an automobile, to be used in a refrigerating cycle for conditioning an air in an interior of a car body, comprising: an enclosed or hermetic-type electromotive compressor, having: a compression mechanism portion provided within an enclosed or hermetic chamber; and an electric motor portion provided within said enclosed or hermetic chamber for driving said compression mechanism through a rotation shaft, wherein a bottom portion is defined by an interior surface of said enclosed or hermetic chamber opposing to a side surface of said rotation shaft, and further comprising; a DC power source for supplying an electric power to said enclosed or hermetic-type electromotive compressor; and a partition member for partitioning between a space including a coolant emission port of said compression mechanism and a space including a coolant emission opening for emitting the coolant from said enclosed or hermetic chamber into the refrigerating cycle, and having passages in upper and lower portions thereof; and a lubricating oil supply opening being disposed within the space including said coolant emission opening.

BRIEF DESCRIPTION OF THE DRAWINGS

Those and other features, objects and advantages of the present invention will become more apparent from the following description when taken in conjunction with the accompanying drawings wherein.

DETAILED DESCRIPTION OF PREFERRED EMBODIMENTS

Figure 1:
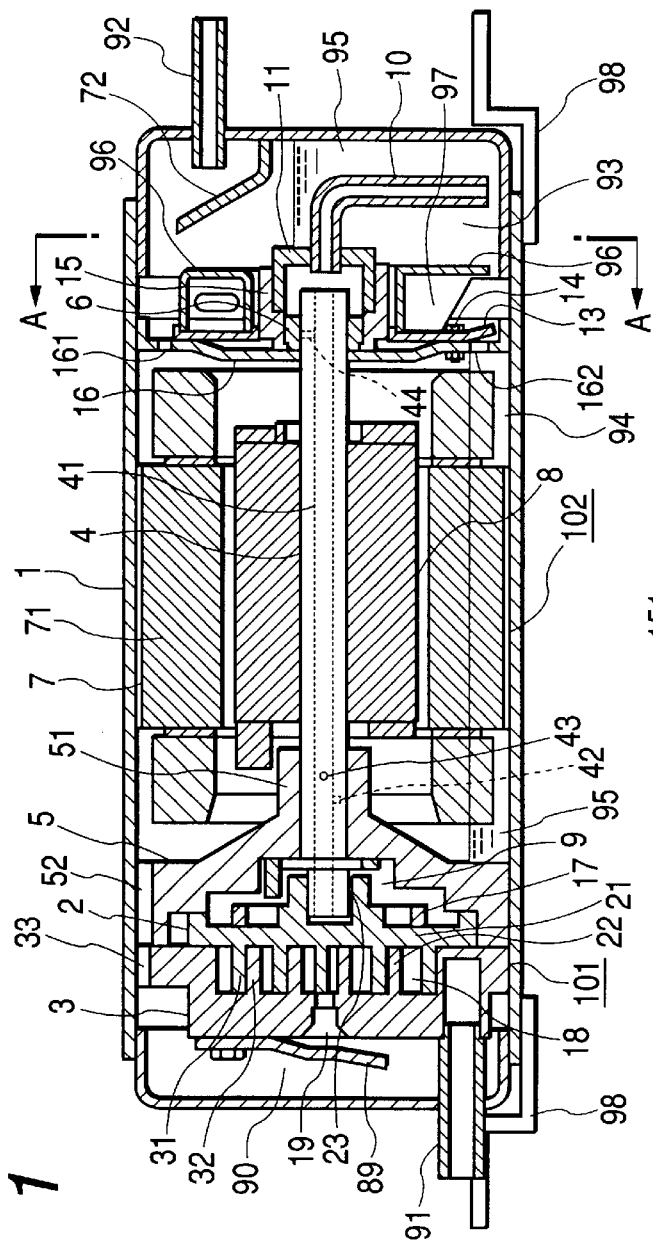
FIG. 1 is a vertical cross-section view of an electromotive compressor of an air-conditioner for use in an automobile, according to an embodiment of the present invention.
Figure 2:
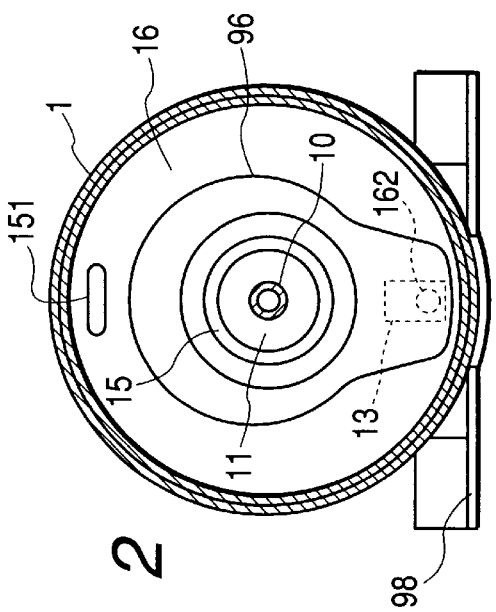
FIG. 2 is a cross-section view for showing the structure of a partition plate shown in the FIG. 1, along with arrows A—A.
Figure 3:
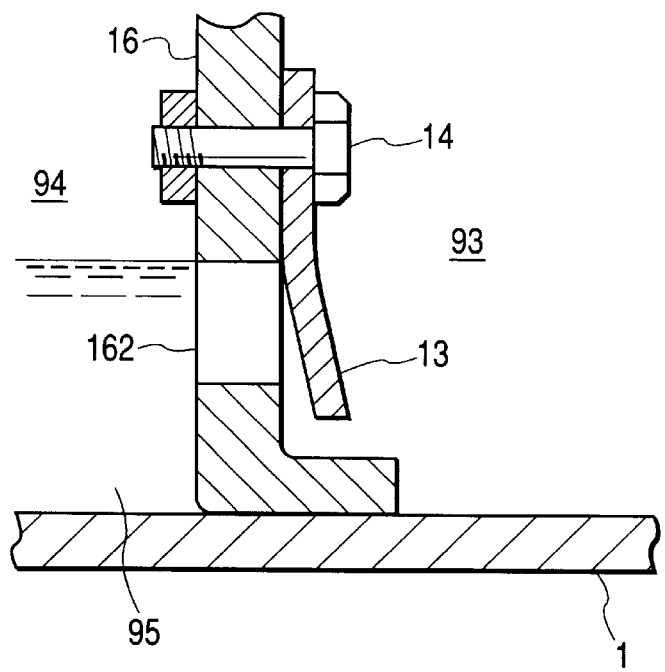
FIG. 3 is an enlarged view of the compressor, in particular in the vicinity of a check valve thereof.
Figure 4:
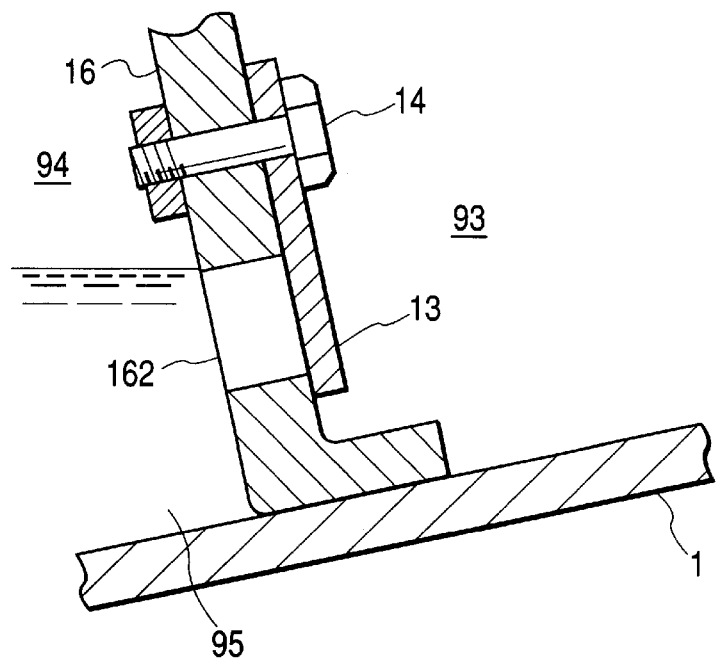
FIG. 4 is a view for showing the vicinity of the check valve when the compressor is inclined.
Figure 5:
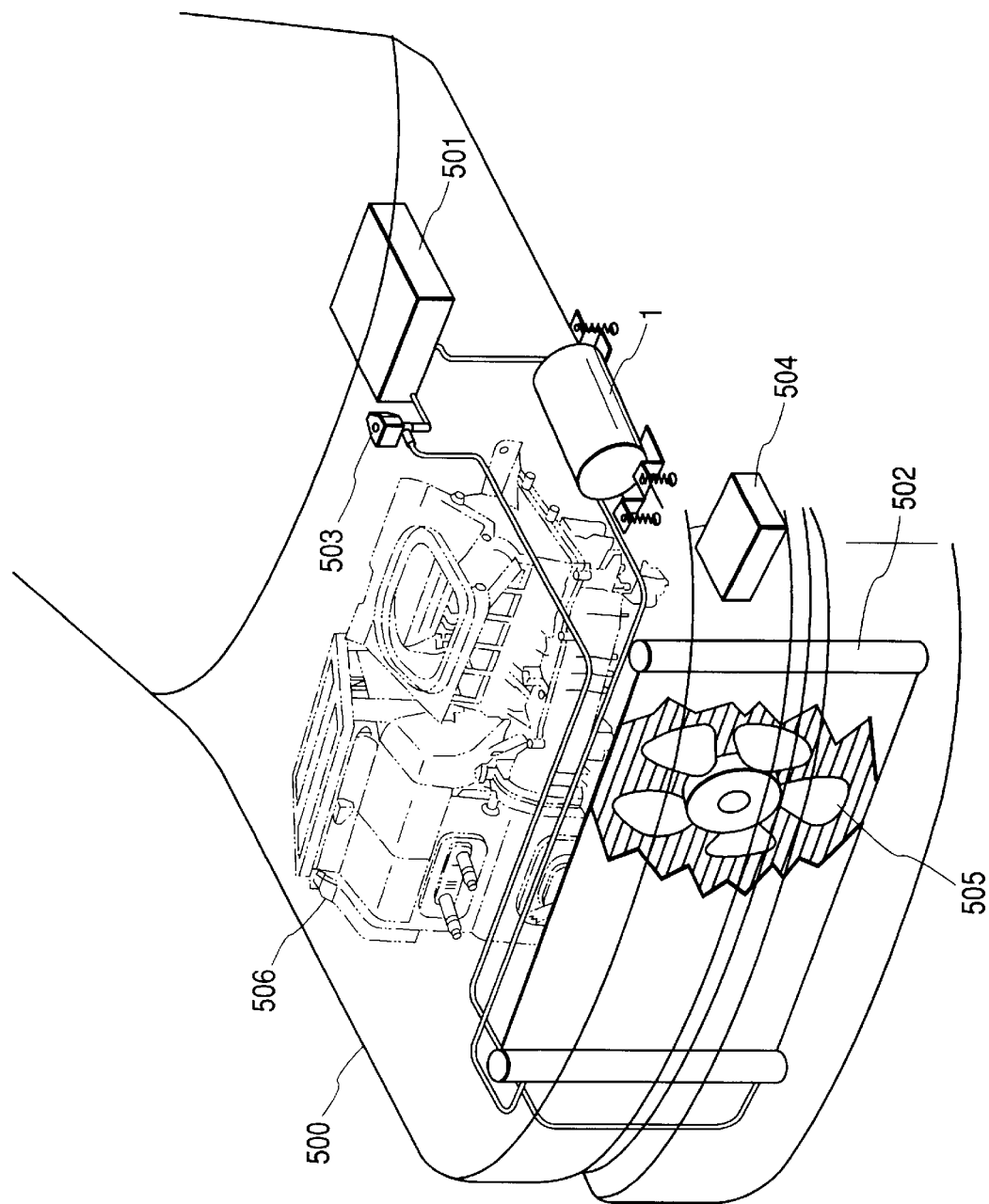
FIG. 5 is a perspective view for showing an example when the compressor is installed in a car, actually.

Hereinafter, embodiments according to the present invention will be fully explained by referring to the attached drawings. An electromotive compressor of an air-conditioner for use in an automobile, according to a first embodiment of the present invention, will be explained by referring to FIGS. 1 to 5. Herein, FIG. 1 is a vertical cross-section view of an electromotive compressor of an air-conditioner for use in an automobile, according to an embodiment of the present invention; FIG. 2 is a cross-section view for showing the structure of a partition plate shown in the FIG. 1, along with arrows A—A; FIG. 3 is an enlarged view of the compressor, in particular in the vicinity of a check valve thereof; FIG. 4 is a view for showing the vicinity of the check valve when the compressor is inclined; and FIG. 5 is a perspective view for showing an example when the compressor is installed in a car, actually.

First of all, explanation will be given on the structure and the operation of the electromotive compressor of the air-conditioner for use in an automobile, by referring to FIG. 1. An enclosed or hermetic-type electromotive compressor of the present embodiment is a horizontal-type scroll compressor, comprising: a compression mechanism 101 made up with a rotary scroll portion 2 and a fixed scroll portion 3 fixed within an enclosed or hermetic chamber, i.e., a case 1; an electric motor portion 102 made up with a rotor 8 and a stator 7 fixed on the case 1; a shaft (or a rotation shaft) 4 for transmitting a driving force of the rotor 8 in the electromotive portion 102 to the rotary scroll portion 2 of the compressor mechanism portion 101; and the case 1 for storing those component parts therein, etc. The shaft 4 is supported by the means of a main shaft bearing 51 provided on a frame 5 and an auxiliary shaft bearing 6 provided on an opposite side thereof of the rotor 8. The main shaft bearing 51 is made up with a plane bearing. The frame 5 is fixed on the case 1. The auxiliary shaft bearing 6 is formed in a spherical shape on an outside thereof, so that it is supported by a bearing housing 15 to be movable, but this is a kind of the plane bearing.

A partition plate 16, as a partitioning member, supports the bearing housing 15. A portion of the shaft 4, in particular on a side being nearer to the compressor mechanism portion than the main shaft bearing, is formed in an eccentric form, and it is inserted into a rotary shaft bearing 23. The rotary shaft bearing 23 is also made up with the plane bearing. With rotation of the rotor 8 of the electric motor portion 102, the shaft 4 rotates; therefore the rotary scroll portion 2 performs a rotation movement, i.e., a circular motion without the spinning thereof. For the purpose of prevention of the rotary scroll portion 2 from the spin, the Oldham ring 17 is provided as a spin prevention mechanism. On a mirror plate 21 of the rotary scroll portion 2 rises up a scroll rap 32 in the swirl-like manner or shape, while on a mirror plate 31 of the fixed scroll portion 3 also a scroll rap 32, and they are disposed to mesh with each other, i.e., plural numbers of compressor chambers are formed by each of the scroll raps.

A coolant sucked from a suction pipe 91 is led into a compression chamber 18, to be compressed within the compression chamber due to the fact that it is gradually reduced in volume accompanying with the rotating movement of the rotary scroll portion 2, and is emitted into a fixed reverse side chamber, through which the compression chamber is communicated with an emission opening (or an emission port) 19 provided on the fixed scroll portion 3. In the emission opening 19 is provided a check valve 89. The coolant, being compressed at high pressure and emitted into the fixed reverse side chamber 90, passes through a gas circulation drain 33 provided on an outer periphery of the fixed scroll portion 3 and a gas circulation drain 52 provided on an outer periphery of the frame 5, and reaches up to the stator of the electric motor 102. The coolant reaching up to the stator 7 passes through a stator drain 71, thereby cooling down the stator 7, and in this instance much of the lubricating oil contained within the coolant is separated from into a lower portion of the electric motor 102, i.e., falls down in the vicinity of the bottom of the case 1.

A reference numeral 95 shown in the FIG. 1 indicates the lubricating oil accumulated or collected on the case bottom. Namely, since the present compressor is the horizontal-type compressor, an interior surface of the case 1 opposing to a side surface of the shaft 4 is the bottom portion, where the lubricating oil for lubricating each sliding portion is stored. The gas passing through the stator 7 goes through a gas passage 161 provided on an upper portion of the partition plate 16, further through a lubricating oil collecting space (i.e., an oil storage chamber) 93 provided at the right-hand side of the partition plate 16, and it is emitted from a coolant emission opening of the emission pipe 92. This coolant emission opening is formed within the lubricating oil collecting space. Further, for the purpose of prevention of the lubricating oil from being emitted from the emission pipe 92 is provided a baffle 72.

Next, explanation will be given on the supply of the lubricating oil to the shaft and/or the shaft bearings. In an axial direction of the shaft 4 penetrates through a bore 41, and also are opened bores 42 and 43 into a portion being received by the main shaft bearing 51 in the radial direction thereof, while bore 44 in a portion being received by the auxiliary shaft bearing 6 into the radial direction. An opening as an oil supply port of the oil supply pipe 10 is disposed within the oil storage chamber 93 and further provided with an opening facing to the bottom of the case 1. And, this opening is provided at a position where it is as near to the bottom portion as possible. In this manner, since the opening of the oil supply pipe 10 is disposed at the position where the lubricating oil lies at high provability or possibility, it is possible to escape from the condition of non-oil supply even in the case where a car is inclined. The lubricating oil stored in the oil storage chamber 93 goes from the oil supply pipe 10 through an oil supply cap 11 and the bore 41 of the shaft 4, to be supplied onto the auxiliary shaft bearing 6 from the bore 43 and also onto the main shaft bearing 51 from the bores 41 and 42. Further, the lubricating oil reaches to an end surface of the shaft through the bore 41, and is supplied onto the rotary shaft bearing 23 therefrom. A driving force for the flow of lubricating oil is due to a difference within pressure between a high pressure in the oil storage chamber 92 and a middle pressure within the reverse side chamber 9. The pressure in the reverse side chamber 9 is controlled at the middle between an emission pressure and a suction pressure, and it suppresses the rotary scroll portion towards the fixed scroll portion 3.

Explanation will be given on a mechanism for letting the opening of the oil supply pipe 10 to lie within the lubricating oil in spite of the inclination and/or the acceleration and deceleration of the car. As was shown in the FIGS. 1 and 2, when the coolant at high pressure enters into the oil storage chamber 93 from the electric motor portion 102, passing through the small gas passage 161 opened in the partition plate 16, it comes down in pressure due to the resistance in passage when passing through the gas passage 161, and therefore the pressure within the oil storage chamber 93 comes to be lower than that within an electric motor chamber 94. For this reason, with the oil surface of oil collected in the case 1, while it within the oil storage chamber 93 comes to be lower than that within the electric motor chamber 94, the lubricating oil 95 collected within the electric motor chamber 94 enters through an oil passage 162 provided in a lower portion of the partition plate 16 into the oil storage portion or chamber 93.

Due to the partition plate 16 provided with this gas passage 161 and the oil passage 162, it is possible to rise up the oil surface within the oil storage portion 93. For this reason, the opening of the oil supply pipe 10 is dipped into the lubricating oil with certainty even when the car is inclined, therefore the oil supply to each sliding portion can be achieved with certainty.

However, in this instance, although also the gas enters into from the oil passage 162, since bubbles goes up within a gas removal passage 97 covered by a cover 96, no bubbles enters into from the oil supply pipe 10, thereby obtaining an effect that reliability can be improved on the shaft bearings.

Also, since the oil surface of the lubricating oil 95 collected in the lower portion of the electric motor portion 102 can be made lower than the rotor 8, no lowering occurs in the performance due to stirring of the lubricating oil. Also, though the gas passage 161 and the oil passage 162 are explained to be provided at one place for each thereof, however they may be provided in plural numbers thereof for each.

By the way, if the car is parked under the condition that the oil storage chamber 93 comes to be higher than the space including the exit opening 19 of the compression mechanism portion, and if the air-conditioner is stopped in operation and the compressor is stopped for a long time, the coolant moves to be balanced in pressure, and accompanying with this, the lubricating oil in the oil storage chamber 93 flows into a space including the exit opening 10 of the compression mechanism portion (i.e., the electric motor chamber 94 in the present embodiment) due to the gravity, thereby sometimes causing cases where the opening of the oil supply pipe 10 is not dipped into the lubricating oil. For dissolving such the problem, according to the present embodiment, a check valve 13 is provided in the passage, and in particular it is located in the lower portion of the partition plate 16, i.e., at the oil passage 162.

FIG. 3 shows an enlarged view of the check valve 13 and the vicinity thereof. The check valve 13 is made up with a soft elastic material, and it is fixed on the partition plate 16 by a screw 14. When the lubricating oil 95 tries to flow from the electric motor chamber 94 into the storage chamber 93 due to the pressure difference mentioned previously, the check valve 13, while being pushed by the lubricating oil, easily opens, and the lubricating oil 95 flows into the oil storage chamber 93. On the other hand, in a case where the car body is inclined, and then also the compressor is inclined in such the direction that the compression mechanism comes down to the lower side, the lubricating oil tries to flow from the oil storage chamber 93 into the electric motor chamber 94 due to the gravity, however since the check valve 13 is closed by suppression of the lubricating oil, as shown in FIG. 4, the reverse flow of the lubricating oil is prevented or is small in an amount of movement thereof if possible. Accordingly, it never happen that the lubricating oil goes away from the suction portion (i.e., the opening) of the oil supply pipe 10 and stops the oil supply to the shaft, the shaft bearings, etc., so that no such the wear-out and seizure are caused, and therefore, a high reliability can be ensured.

FIG. 5 shows an example of a system, in which the electromotive compressor according to the present invention is installed in the automobile. This automobile is the so-called idling-stop car. A horizontal-type electromotive compressor 1, a condenser 502, an electromotive expansion valve 503 and an evaporator 501 are connected sequentially through connection pipes, thereby building up the refrigeration cycle. In this example, within an engine room of a car body 500 are disposed the horizontal-type electromotive compressor 1, the condenser 502, and a control electric part 504, including such as, an inverter, etc. A reference numeral 506 indicates the engine. The evaporator 501 is disposed within a cooling unit (not shown in the figure), thereby guiding cool/hot air into an interior of the car. An electric power source for driving the electromotive compressor 1 is a battery for storing electric power from a generator (not shown in the figure) for generating electricity by motive force from the engine 506, and electricity is supplied to the stator by means of the inverter, thereby to generate rotating electric field. This is an aspect differing from the air-conditioner for home use. Thus, the driving electric power source for the home use air-conditioner is AC, and the air-conditioner comprises a converter for converting AC into DC in an inside thereof. However, in case of the air-conditioner for use in an automobile, since already exists the DC power source, therefore it is not necessary to provide such the converter, further. In this aspect, it is also same to the electric car, in which an electric motor for driving the car is provided in the place of the engine 506. The electric car is equipped with a battery or a fuel cell as the driving electric power source, and also the electric power source installed therein for the air-conditioner is one of those DC electric power sources. Accordingly, there is no necessity for the air-conditioner to comprise such the converter, also in the electric car.

As was mentioned in the above, according to the present embodiment, since the pressure within the oil storage chamber 93 is kept to be lower than that within the electric motor chamber 94, into the oil storage chamber 93 can be supplied the lubricating oil, sufficiently. Therefore, the lubricating oil can be supplied from the oil supply pipe 10 to the shaft and the shaft bearings, etc., fully, thereby achieving an object that the high reliability can be guaranteed.

Also, according to the present embodiment, with provision of the check valve 13 in the oil passage 162 of the partition plate 16, the reverse flow of the lubricating oil can be stopped even when the compressor is inclined, therefore can be also obtained the effect that the lubricating oil can be supplied from the oil supply pipe 10 to the shaft and the shaft bearings, etc., fully, thereby achieving an object that the high reliability can be guaranteed.

And also, according to the present invention, since to all of the main shaft bearing and the auxiliary shaft bearing, and also to the rotating shaft bearings can be applied the plane bearing, therefore the shaft bearing comes to be simple in the structure to be manufactured easily, thereby bringing about an effect that the cost thereof can be lowered down.

Furthermore, according to the present embodiment, since the oil supply of the lubricating oil is conducted by utilizing the pressure difference, no provision of such the oil supply pump, etc., is necessary, therefore the structure comes to be simple, thereby bringing about an effect that costs can be lowered with high reliability.

Figure 6:
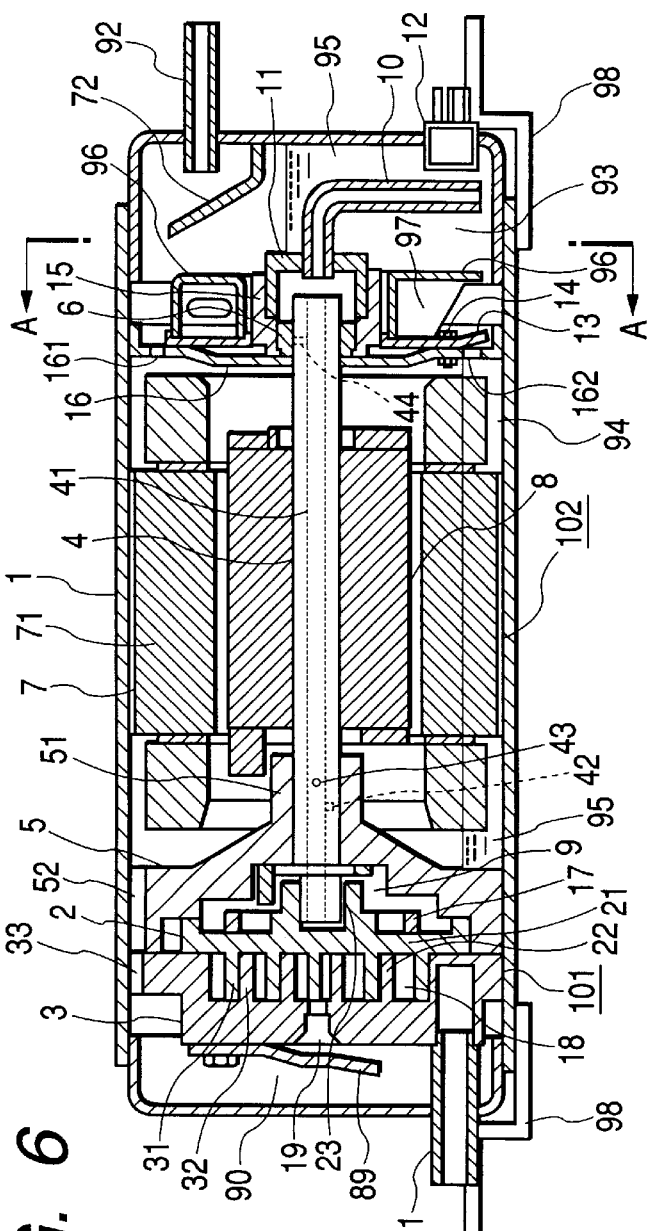
FIG. 6 is a vertical cross-section view of an electromotive compressor of an air-conditioner for use in an automobile, according to other embodiment (i.e., a second embodiment) of the present invention.

The cross-section view of the electromotive compressor of the air-conditioner for use in an automobile, according to other embodiment (i.e., a second embodiment) of the present invention is shown in FIG. 6. In the present embodiment, an oil surface sensor 12 is attached on a case portion of the oil storage chamber 93. However, other structures and operations thereof are same to those in the first embodiment, therefore the explanation on them is omitted herein.

As was explained in the first embodiment, since the check valve is provided in the oil passage 162 provided on the partition plate 16, the lubricating oil will not flow back into the electric motor chamber 94 even when the compressor is inclined. However, in a where the car runs on a road continuing a steep slope for very long time, there can be considered a provability that the lubricating oil 95 stored runs out or short in the oil storage chamber 93 since no lubricating oil is refilled therein. Then, detecting the case when the lubricating oil 95 stored within the oil storage chamber 93 is lowered down, by the means of a oil surface sensor 12, so as to conduct a control of lowering the rotation speed of the motor for the compressor in such case, thereby it is possible to protect the shaft and the shaft bearings from the wear-out and seizure due to shortage of lubrication thereupon.

Figure 7:
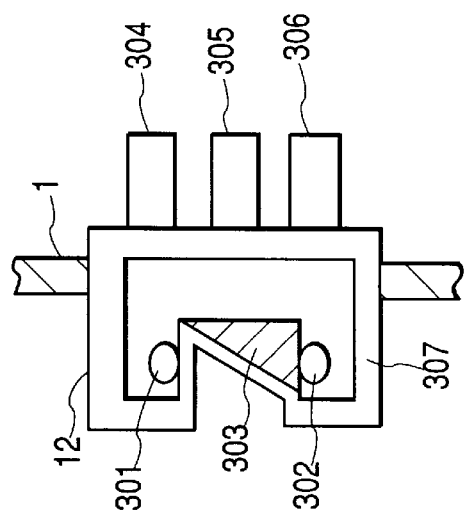
FIG. 7 is a view for showing an example of an oil surface sensor in the second embodiment.

FIG. 7 shows an example of the oil surface sensor. This sensor utilizes a difference in the refractive index of light between the oil and the coolant. A reference numeral 301 is a light-emitting portion, which emits the visible light rays. A reference numeral 302 is a light-receiving portion, being made up with, such as a phototransistor, etc. Between the light emission portion and the light-receiving portion is provided a prism 303. The light emitted from the light-emitting portion 301 is refracted in the prism 303, and reaches to the light-receiving portion 302. In the coolant and the oil, the refractive index differs from that in the prism 303, therefore an intensity of the light received on the light-receiving portion 302 clearly differs from; therefore it is possible to detect the lowering of the oil surface. On the entire body of the sensor is treated a glass-coating 307, and enclosed terminals 304–306 are taken out to an outside of the case 1. Processing, such as amplifying, etc., is conducted on the signals taken out therefrom, thereby achieving the detection of lowering of the oil surface. However, though an optical sensor is applied as the oil surface sensor in the present embodiment, but it is also possible to use other types of the sensors, such as the float-type, the static capacitive-type, etc.

Further, in such the case where the condition of oil-shortage continues longer than a predetermined time period, the compressor 1 is controlled to stop the operation, for the purpose of protection thereof.

According to the present embodiment, even if the condition that the car body is inclined continues for a very long time, the shaft and the shaft bearings can be protected from the wear-out and seizure due to the ill lubrication, by the means of the method, such as, of conducting a control of lowering the rotation speed of the electric motor for the compressor, etc., thereby achieving an effect of lessening the chance of bringing the user in uncomfortable condition, such as, the stoppage of the air-conditioning by the air-conditioner.

Figure 8:
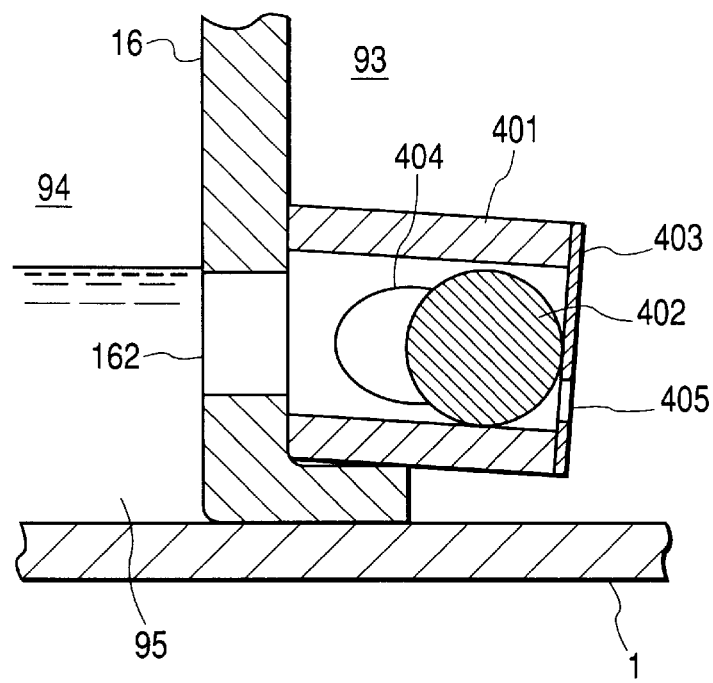
FIG. 8 is a view for showing a check valve mechanism of a lubricating oil, according to further other embodiment (i.e., a third embodiment) of the present invention.
Figure 9:
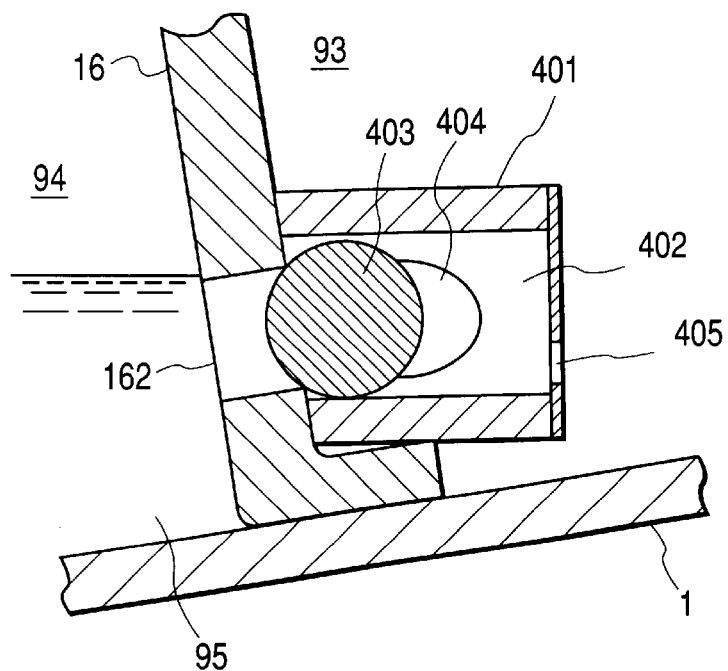
FIG. 9 is a view for showing the operation of the check valve mechanism of the lubricating oil, when the compressor is inclined.

FIG. 8 shows the check valve mechanism for the lubricating oil, according to further other embodiment (i.e., a third embodiment) of the present invention. According to the present embodiment, in the oil passage 162 provided on the partition plate 16, in the first embodiment shown in the FIG. 1, alternation is made on the check valve method (i.e., the method for protection from reverse flow) for the lubricating oil 95 flowing from the oil storage chamber 93 into the electric motor chamber 94, but other structures and operations thereof are still same to those in the first embodiment, then the explanation thereon will be omitted herein. FIG. 8 shows the reverse-flow protecting structure (i.e., the check valve), being provided in the oil passage 162, in particular being located on the partition plate 16 in the FIG. 1. In this FIG. 8, a pipe 401 is provided on a side of the oil storage chamber 93 of the oil passage 162, and in the pipe 401 is entered a spherical body 402. A small slope is made in the pipe 401 on the side of the oil storage chamber 93. A stopper is provided on an end surface of the pipe 401 at the side of the oil storage chamber 93, thereby protecting the spherical body 402 from falling down into an outside of the pipe 401. On the pipe 401 is opened an oil removal hole 404, and also on the stopper 403 is opened an oil removal hole 405, too. The diameter of the spherical body 402 is set to be larger than that of the circular oil passage 162. The spherical body 402 may be made of a material, such as stainless, or resin, etc.

Next, explanation will be given on the operation of the check valve mechanism according to the present embodiment. Since the pipe 401 is inclined when the main body of the compressor is not inclined, the spherical body 402 lies on a side of the stopper 403. The lubricating oil 95 enters into the pipe 401 from the oil passage 162, and it flows into the oil storage chamber 93 from the oil removal holes 404 and 405. When the main body of the compressor is inclined in the direction of lowering a side of the compression mechanism thereof down since the car body declines, the spherical body 402 moves toward the partition plate 16, thereby just closing the oil passage 162. Accordingly, the lubricating oil will not flow back in the direction from the oil storage chamber 93 into the electric motor chamber.

According to the present embodiment, the gravity is used in the structure of check valve for the lubricating oil, the oil passage is shut off with certainty, when the car body declines so that the compressor is inclined, and the lubricating oil within the oil storage chamber 93 will not come down due to the flow-back of the lubricating oil, thereby achieving an effect that high reliability can be ascertained since the lubricating oil will be supplied from the oil supply pipe 10 to the shaft and the shaft bearings, fully.

As is fully explained in the above, according to the present invention, the lubricating oil can be supplied fully to the shaft and the shaft bearings, even when the compressor is inclined accompanying with traveling, stoppage and parking of the car, therefore providing an air-conditioner giving the less to the user uncomfortable feeling that air-conditioning cannot be performed due to shortage of the lubricating oil.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. An air-conditioner for use in an automobile, to be used in a refrigerating cycle for conditioning an air in an interior of a car body, comprising:
   a hermetic-type electromotive compressor, having:
      a compression mechanism portion provided within an enclosed chamber; and
      an electric motor portion provided within said enclosed chamber for driving said compression mechanism through a rotation shaft, wherein a bottom portion is defined by an interior surface of said enclosed chamber opposing to a side surface of said rotation shaft;
   a DC power source for supplying an electric power to said hermetic-type electromotive compressor; and
   a partition member for partitioning between a space including a coolant emission port of said compression mechanism and a space including a coolant emission opening for emitting the coolant from said enclosed chamber into the refrigerating cycle, and having passages in upper and lower portions thereof; and
   a lubricating oil supply opening being disposed within the space including said coolant emission opening;
   wherein a check valve is provided in the passage of the lower portion of said partition member.

2. An air-conditioner for use in an automobile, as defined in the claim 1, comprising an oil surface sensing means provided in the space including said coolant emission opening.

3. An air-conditioner for use in an automobile, as defined in the claim 1, comprising, a main shaft bearing and an auxiliary shaft bearing for supporting the rotation shaft of said electric motor portion, where the main shaft bearing and auxiliary shaft bearing include plane bearings.

4. An air-conditioner for use in an automobile, as defined in the claim 1, wherein the check valve allows lubricating oil to be check valved by pressure into the enclosed space including the lubricating oil supply opening.

5. An air-conditioner for use in an automobile, as defined in the claim 1, wherein the check valve is at least one of a flapper check valve and ball check valve.

6. An air-conditioner for use in an automobile, as defined in the claim 1, comprising a plurality of check valves disposed in the air-conditioner.

7. A horizontal hermetic-type electromotive compressor, comprising:
   a compression mechanism portion provided within an enclosed chamber; and
   an electric motor portion provided within said enclosed chamber for driving said compression mechanism through a rotation shaft, wherein a bottom portion is defined by an interior surface of said enclosed chamber opposing to a side surface of said rotation shaft;
   a partition member for partitioning between a space including a coolant emission port of said compression mechanism and a space including a coolant emission opening for emitting the coolant from said enclosed chamber into the refrigerating cycle, and having passages in upper and lower portions thereof;
   a check valve provided in the passage of the lower portion of said partition member; and
   a lubricating oil supply opening being disposed within the space including said coolant emission opening.

8. A compressor, as defined in the claim 7, comprising an oil surface sensing means provided in the space including said coolant emission opening, to detect an oil level of lubricating oil.

9. A compressor, as defined in the claim 7, comprising, a main shaft bearing and an auxiliary shaft bearing for supporting the rotation shaft of said electric motor portion, where the main shaft bearing and auxiliary shaft bearing include plane bearings.

10. A compressor, as defined in the claim 7, wherein the check valve allows lubricating oil to be check valved by pressure into the enclosed space including the lubricating oil supply opening.

11. A compressor, as defined in the claim 7, wherein the check valve is at least one of a flapper check valve and ball check valve.

12. A compressor, as defined in the claim 7, comprising a plurality of check valves disposed in the compressor.

13. A horizontal hermetic-type electromotive compressor, comprising:
   a compression mechanism portion provided within an enclosed chamber; and
   an electric motor portion provided within said enclosed chamber for driving said compression mechanism through a rotation shaft, wherein a bottom portion is defined by an interior surface of said enclosed chamber opposing to a side surface of said rotation shaft;
   a partition member for partitioning between a space including a coolant emission port of said compression mechanism and a space including a coolant emission opening for emitting the coolant from said enclosed chamber into the refrigerating cycle, and having passages in upper and lower portions thereof;
   a check valve being provided in the passage of the lower portion of said partition member;
   an oil surface sensing means being provided in the space including said coolant emission opening; and
   a lubricating oil supply opening being disposed within the space including said coolant emission opening.

14. A compressor, as defined in the claim 13, wherein the oil surface sensing means is provided in the space including said coolant emission opening, to detect an oil level of lubricating oil; and the compressor comprising:

a controller to control a rotation speed of the electric motor portion taking into account the oil level detected by the oil surface sensing means.

15. A compressor, as defined in the claim 13, comprising, a main shaft bearing and an auxiliary shaft bearing for supporting the rotation shaft of said electric motor portion, where the main shaft bearing and auxiliary shaft bearing include plane bearings.

16. A compressor, as defined in the claim 13, wherein the check valve allows lubricating oil to be check valved by pressure into the enclosed space including the lubricating oil supply opening.

17. A compressor, as defined in the claim 13, wherein the check valve is at least one of a flapper check valve and ball check valve.

18. A compressor, as defined in the claim 13, comprising a plurality of check valves disposed in the compressor.

* * * * *